(No Model.)

A. A. PRATT.
POTATO DIGGER.

No. 484,817. Patented Oct. 25, 1892.

Witnesses
Chas. H. Ourand
D. P. Holhaupter

Inventor
Austin A. Pratt.
By his Attorneys,
C. A. Snow & Co.

UNITED STATES PATENT OFFICE.

AUSTIN A. PRATT, OF INDEPENDENCE, OREGON.

POTATO-DIGGER.

SPECIFICATION forming part of Letters Patent No. 484,817, dated October 25, 1892.

Application filed December 31, 1891. Serial No. 416,629. (No model.)

*To all whom it may concern:*

Be it known that I, AUSTIN A. PRATT, a citizen of the United States, residing at Independence, in the county of Polk and State of Oregon, have invented a new and useful Potato-Digger, of which the following is a specification.

This invention relates to potato-diggers; and it has for its object to provide a machine of this class which is so constructed as to allow the vine and potatoes to be readily passed through the same without clogging and which while shaking the dirt clinging to the potatoes will leave the same in a single snug row, thereby saving a great amount of labor in picking up the produce, which is greatly scattered by the ordinary diggers.

It is also a feature of this invention to provide means whereby the machine is enabled to run smoothly and steadily at one depth, in order that the potatoes may be readily dug, while at the same time avoiding the possibility of slicing and injuring the same.

With these and many other objects in view, which will readily appear as the nature of the invention is fully understood, the same consists in the novel construction, combination, and arrangement of parts hereinafter more fully described, illustrated, and claimed.

Figure 1:
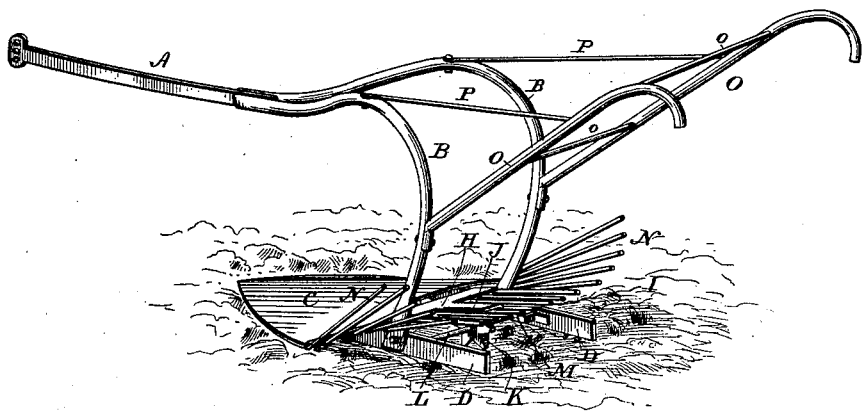
Figure 2:
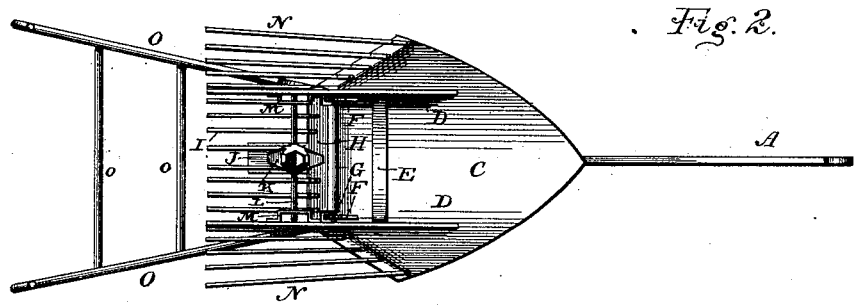
Figure 3:
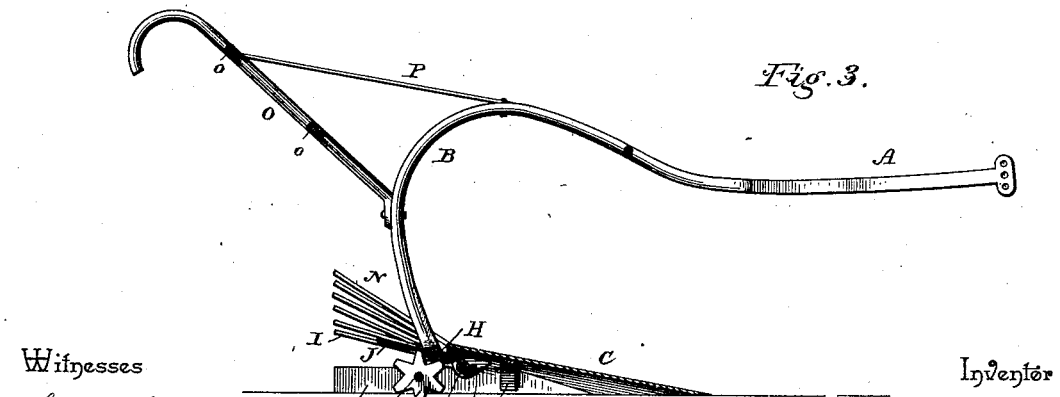

In the accompanying drawings, Figure 1 is a perspective view of a potato-digger constructed in accordance with this invention. Fig. 2 is a bottom plan view. Fig. 3 is a vertical longitudinal sectional view of the same.

Referring to the accompanying drawings, A represents a draft-beam, to the rear end of which are secured by bolts the curved standard-beams B, diverging rearwardly from said draft-beam and curved downward to form opposite standard portions, to the feet of which is bolted the forwardly-extending shield-shaped digging-shovel C. The shovel C, as said, is of an approximate shield shape, slightly curved upon its upper face and having the opposite sides extending rearwardly at an angle, thereby taking evenly into the ground, while the said shovel itself extends forward of said standard portions of the beam in almost a horizontal plane, so that the same may readily travel under the potatoes and the vine and carry the same rearwardly thereover as the machine is moved in a forward direction. Securely bolted to the bottom of said shield-shaped shovel and at the extreme lower ends of said standard-beams are the parallel rearwardly-extending landside-runners D, projecting some distance in rear of said shovel and said standard-beams in a line with the point of the shovel, so that the digger may run steadily and smoothly and always at the same depth, thereby avoiding the bobbing in and out of the ground and slicing the potatoes, as many of the machines now in use do. The said landsides are securely braced apart and held steady in their position beneath the digging-shovel by means of the transverse brace E, bolted to the bottom of the shovel and to each of said landside-runners. Opposite bearing-lugs F are bolted to the under rear end of the shovel and accommodate the transverse rod G, mounted therein, and upon which is pivotally mounted the shaker base-plate H, extending across the entire width of the rear edge of the shovel between the standard portions of said standard-beams and having securely bolted thereto a series of shaking-fingers I, parallel with each other and extending rearwardly a sufficient distance in order that the potatoes which pass over the top of the shovel and between the standard-beams may be readily freed from the dirt and left in a single row by said shaker when vibrated. The central portion of said vibrator or shaker is provided with a strike-plate J, that is adapted to be struck intermittently by the teeth of the traveling spur-wheel K, located therebeneath and mounted upon the transverse shaft L, journaled in the opposite boxes M on the inner sides of the parallel landside-runners, and it can be readily seen that as the machine moves in a forward direction the spur-wheel will be revolved, and the teeth thereof, intermittently striking beneath said strike-plate, will thus cause the whole shaker-frame to be rapidly vibrated, and thus beat the dirt clinging to the potatoes. To the opposite rear corners of said shield-shaped shovel is secured a series of guard or mold-board fingers N, extending rearwardly therefrom and in a line with the extreme outer ends of the fingers of said shaker and arranged at an inwardly-extending angle arising from the outer fingers of said shaker, and thus inclosing the same, so that as the vines and potatoes pass over the shovel and shaker in rear thereof the said side fingers serve to prevent the said produce from being spread either to the right or left of the machine, and thus confine the same upon the shaker, so that they will be left in a single row behind the machine, and said fingers extending from the outer rear corners of the shovel beyond the standard-beams also serve in the capacity of mold-boards, which collect the potatoes and vines dug up which may have a tendency to escape from the sides of the shovel and carry the same rearwardly and throw them, also, upon the said shaker, thus covering a wide area, while at the same time preventing the potatoes from spreading. Securely bolted to the outsides of the standard portions of said standard-beams are the rearwardly and upwardly extending handles O, securely braced together by the transverse braces o, bolted thereto, and by the forwardly-extending braces P, bolted to the front sides of said handle and on the inside of said standard-beams, thus providing a secure handle attachment which allows for a ready manipulation of the machine, while at the same time permitting the produce to pass through the beams and be confined in a single row in the manner herein set forth.

The construction and operation of the herein-described potato-digger are now thought to be apparent without further description.

Having thus described my invention, what I claim, and desire to secure by Letters Patent, is—

In a potato-digger, opposite standard-beams, a flat shield-shaped shovel secured at its rear edge to the lower ends of said beams in an approximately-horizontal plane, parallel landside-runners secured beneath the shovel and extending to the rear of the same in a direct line with the point thereof to travel directly upon the ground, a vibrating shaker pivoted beneath the rear edge of the shovel and comprising a series of parallel beating-fingers and having a central strike-plate, a shaft journaled in said parallel landside-runners, a traveling spur-wheel mounted on said shaft and adapted to intermittently engage said strike-plate, and a series of guard and mold-board fingers secured to the opposite rear corners of the shovel and arranged at an inwardly-extending angle arising from the outer fingers of the shaker, substantially as set forth.

In testimony that I claim the foregoing as my own I have hereto affixed my signature in the presence of two witnesses.

AUSTIN A. PRATT.

Witnesses:
C. W. BUTLER,
J. B. V. BUTLER.